United States Patent [19]

Iizuka et al.

[11] Patent Number: 4,768,123
[45] Date of Patent: Aug. 30, 1988

[54] MAGNETIC DISK CARTRIDGE AND PRODUCING METHOD THEREFOR

[75] Inventors: Michio Iizuka, Saku; Haruo Shiba, Komoro, both of Japan

[73] Assignee: TDK Corporation, Tokyo, Japan

[21] Appl. No.: 131,763

[22] Filed: Dec. 11, 1987

Related U.S. Application Data

[63] Continuation of Ser. No. 731,582, May 7, 1985, abandoned.

[30] Foreign Application Priority Data

May 8, 1984 [JP] Japan .............................. 59-66723[U]

[51] Int. Cl.[4] ............................................ G11B 23/03
[52] U.S. Cl. .................................................. 360/133
[58] Field of Search .................. 360/133, 97; 206/444, 206/309–313; 369/272, 274, 280, 282, 291

[56] References Cited

FOREIGN PATENT DOCUMENTS

2108309  5/1983  United Kingdom ................ 360/133

Primary Examiner—A. J. Heinz
Attorney, Agent, or Firm—Price, Gess & Ubell

[57] ABSTRACT

A magnetic disk cartridge used for memory means for a computer, which comprises a hard case composed of a cover member and a bottom member, and a magnetic disk having a central hole in which a pivot shaft of disk drive means is inserted. An anti-abrasion chip having a polygon shape including a triangle is attached to the inside of the cover member so as to receive the free tip of the pivot shaft of the disk drive means in contact therewith while the magnetic disk is rotated within the hard case. The shape of the anti-abrasion chip is a regular triangle, a right-angled triangle, an isosceles triangle, a square, a rectangle, a trapezoid or the like. A producing method for a magnetic disk cartridge is also disclosed. The anti-abrasion chip having a polygon shape including a triangle is made by cutting an anti-abrasion sheet attached to a base sheet without causing a disuse portion thereof.

20 Claims, 8 Drawing Sheets

MAGNETIC DISK CARTRIDGE AND PRODUCING METHOD THEREFOR

This is a continuation of application Ser. No. 731,582 filed May 7, 1985 now abandoned.

BACKGROUND OF THE INVENTION

The present invention relates to a magnetic disk cartridge for rotatably containing a disk-form magnetic disk within a hard case, and a producing method therefor.

A magnetic disk cartridge of this kind has been increasingly used for memory means for a computer.

A floppy disk has been used for memory means for a computer and it comprises a flexible jacket made of a synthetic resin material such as a vinyl chloride and a disk-form magnetic disk which is rotatably held therein, in which the jacket is provided with windows for a magnetic head and a driving means for rotating the magnetic disk. Therefore, when the jacket is bent during its handling, the magnetic disk contained therein is damaged. Further, there is a danger of contacting the magnetic disk contained in the jacket with a finger or the like inserted therein through the windows, with the result of damaging the record stored in the magnetic disk. Hence, it must be handled with the greatest possible care.

Then, in order to remove the defects of the floppy disk, a hard-type magnetic disk cartridge has been developed, which comprises a hard case made of a synthetic resin material and a disk-form magnetic disk which is rotatably contained therein, in which the magnetic recording medium of the magnetic disk may not be exposed to outside through an opening of the case.

Figure 1:
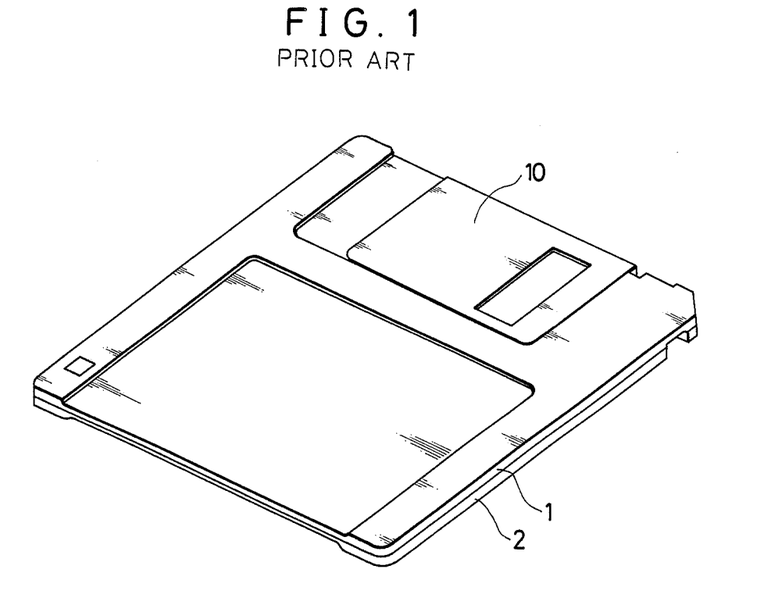
FIG. 1 is a perspective view of a conventional magnetic disk cartridge.
Figure 2:
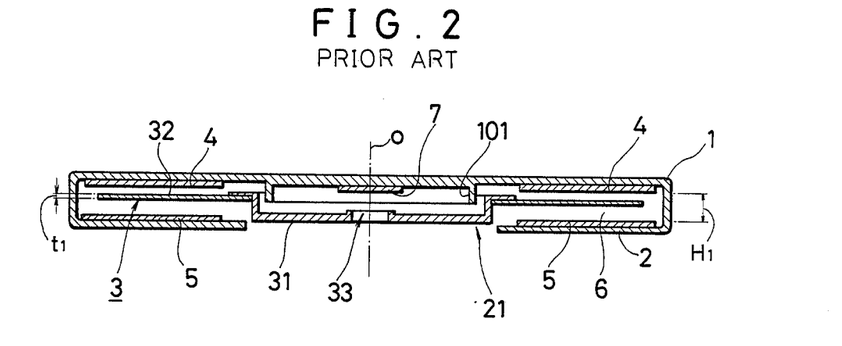
FIG. 2 is an enlarged longitudinal cross section of the cartridge of FIG. 1.

In FIGS. 1 and 2, there is shown a conventional hard-type magnetic disk cartridge comprising a hard case which is composed of a cover member 1 and a bottom member 2, and a disk-form magnetic disk 3 which is rotatably contained in the hard case. The cover member 1 and the bottom member 2 are made of a hard synthetic resin material by molding, which posesses a larger mechanical strength than that of the flexible magnetic disk jacket mentioned above, and thus it is hard to allow the case to deform by bending. Accordingly, the cartridge can protect the magnetic disk 3 contained within the hard case thereof more exactly and reliably as compared with the flexible magnetic disk jacket.

On the inner surfaces of the cover member 1 and the bottom member 2, liners 4 and 5 which are generally made of a soft material, are attached on the opposite sides of the both surfaces of the magnetic disk 3. The case composed of the cover member 1 and the botttom member 2 contains a space 6 having a height $H_1$ which is larger than a thickness $t_1$ of the magnetic disk 3.

The bottom member 2 is provided with a circular opening 21 in its center positioned along a pivot center O, and an anti-abrasion chip 7 having a circular form is attached to the inner center of the cover member 1. The circular anti-abrasion chip 7 prevents the direct contact of the pivot shaft of the disk drive means with the inner surface of the cover member 1 when writing and reading the record in and from the magnetic disk 3, in order to prevent the abrasion of the inner surface of the cover member 1. The cover member 1 is coaxially provided with a circular ring projection 101 projecting inside at a certain distance around the circular anti-abrasion chip 7 attached to the inside of the cover member 1.

Figure 3:
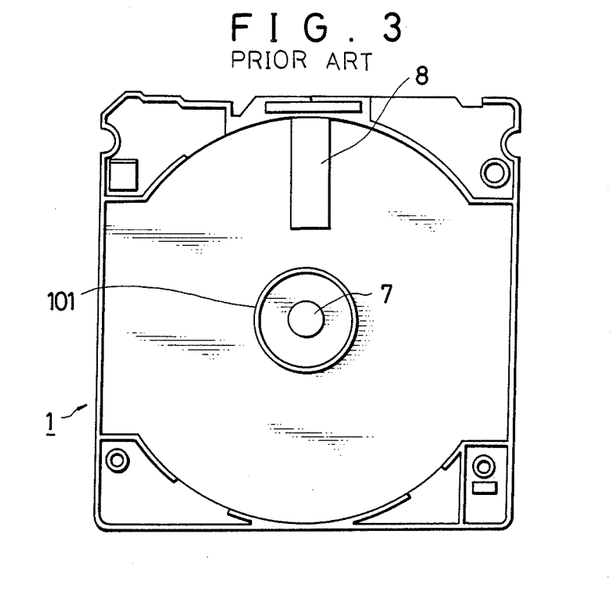
FIG. 3 is a bottom view of a cover member of the cartridge of FIG. 1.
Figure 4:
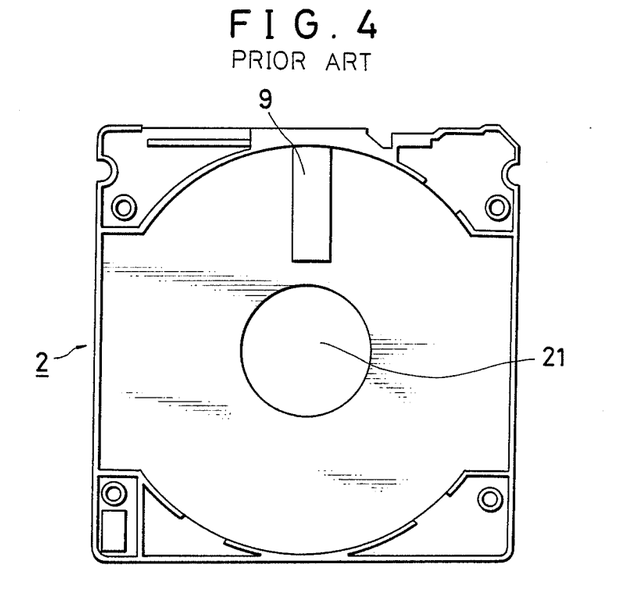
FIG. 4 is a top view of a bottom member of the cartridge of FIG. 1.

As shown in FIGS. 3 and 4, the cover member 1 and the bottom member 2 are further provided with windows 8 and 9, respectively, one for each member, in their corresponding position, through which the magnetic head may be inserted. The windows 8 and 9 are closed by shutters 10 when they are not used, as shown in FIG. 1.

The magnetic disk 3 comprises a stepped hub portion 31 in its center, which is made of a metal or a synthetic resin material, and a doughnut circular ring-form magnetic recording medium 32 which is coaxially connected to the periphery of the hub portion 31. The hub portion 31 is provided with an opening 33 in its center, through which the pivot shaft of the magnetic disk drive means is inserted. When the magnetic disk 3 is contained in the case, the circular ring projection 101 of the cover member 1 is positioned inside of the inner diameter part of the hub portion 31 of the magnetic disk 3 and the outer surface of the hub portion 31 is exposed to the central circular opening 21 of the bottom member 2 so that the magnetic recording medium 32 of the magnetic disk 3 may be completely covered by the cover member 1 and the bottom member 2 therebetween.

Figure 5:
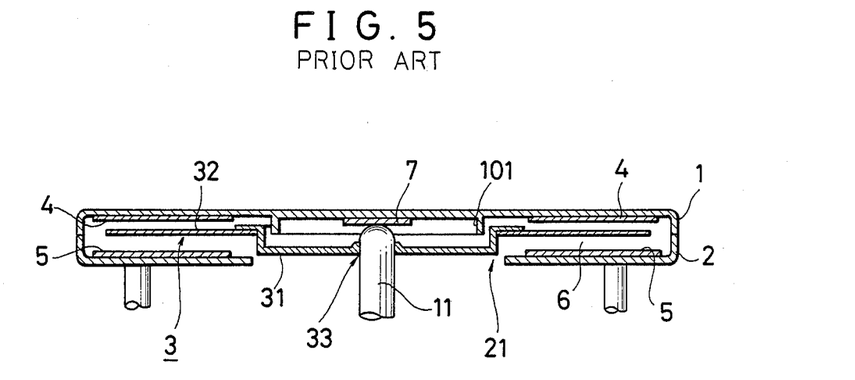
FIG. 5 is an enlarged longitudinal cross section of the cartridge of FIG. 1, which is worked by disk drive means having a pivot shaft which is inserted in a central hole of a magnetic disk.

As shown in FIG. 5, when the above described magnetic disk cartridge is worked, a pivot shaft 11 of a magnetic disk drive means (not shown) is inserted into the central opening 33 of the hub portion 31 of the disk 3 so as to abut against the anti-abrasion chip 7 attached to the center of the cover member 1, and the disk drive means is driven to rotate the pivot shaft 11, thereby rotating the magnetic disk 3 within the case. On this occasion, the windows 8 and 9 are opened by drawing the shutters 10, and the magnetic heads are inserted into the case through the windows 8 and 9 to write and read the record in and out of the magnetic disk 3.

In the conventional hard-type magnetic disk cartridge described above, since the cover member 1 and the bottom member 2 are made of the hard material, the protecting function for the magnetic disk 3 is very high, and, since the shutters 10 and the hub portion 31 are positioned at the head inserting windows 8 and 9 and the pivot shaft inserting opening 21, the magnetic recording medium 32 of the magnetic disk 3 is completely covered by the cover member 1 and the bottom member 2 without exposing it to the outside. Accordingly, the protecting function for the magnetic recording medium of the magnetic disk is far higher as compared with the conventional floppy disk. Further, since the tip of the pivot shaft 11 of the disk drive means is received by the anti-abrasion chip 7 in contact therewith, when the pivot shaft 11 is rotated, the abrasion of the cover member 1 by the pivot shaft 11 can be effectively prevented during the writing and the reading of the record of the magnetic disk 3.

Figure 6:
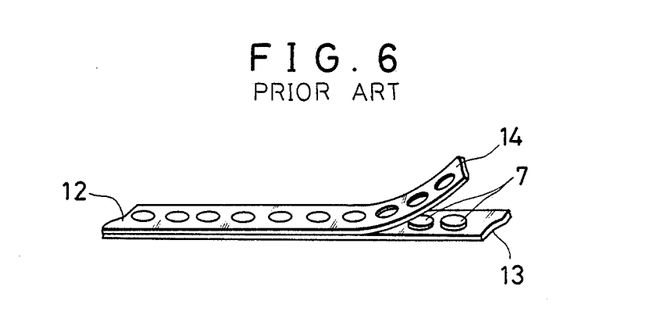
FIG. 6 is a perspective view of an anti-abrasion sheet belt for explaining a production of an anti-abrasion chip by cutting in a conventional manner.

However, in this case, since the shape of the anti-abrasion chip 7 is circular, the anti-abrasion chips 7 are obtained by punching or cutting a circular shape from a belt-form anti-abrasion sheet 12 which is attached to a base sheet 13 such as a paper sheet and which is usually treated by an agent such as silicone so as to readily peel off, as shown in FIG. 6. Thus, in this case, the disuse portion 14 of the anti-abrasion sheet 12 is rather much, which is not economical because the anti-abrasion material is generally high in cost, and which is therefore very disadvantageous for performing the cost-down of the finished magnetic disk cartridge and becomes a large obstacle therefor.

SUMMARY OF THE INVENTION

It is an object of the present invention to provide a magnetic disk cartridge for rotatably containing a disk-form magnetic disk within a hard case, free from the above described defects and disadvantages, which is economical and simple.

It is another object of the present invention to provide a producing method of a magnetic disk cartridge for rotatably containing a disk-form magnetic disk within a hard case, free from the above described defects and disadvantages, which is economical and which is capable of producing the cartridge without causing the loss of the anti-abrasion material.

In accordance with one aspect of the invention, there is provided a magnetic disk cartridge for rotatably containing a magnetic disk therein, in which the magnetic disk is rotated by disk drive means having a pivot shaft, comprising a hard case which is composed of a cover member and a bottom member, a magnetic disk having a hole in its center, which is rotatably contained in the hard case, and an anti-abrasion chip having a polygon shape including a triangle, which is attached to the inside of the case and which receives a free tip of the pivot shaft of the disk drive means in contact therewith, the pivot shaft being inserted in the central hole of the magnetic disk.

In accordance with another aspect of the invention, there is provided a method for producing a magnetic disk cartridge for rotatably containing a magnetic disk within a hard case, comprising cutting an anti-abrasion sheet to obtain an anti-abrasion chip having a polygon shape including a triangle, attaching the anti-abrasion chip to an inner center of a hard cover member, and coupling the cover member with the anti-abrasion chip attached thereto and a bottom member to obtain a hard case while a magnetic disk having a hole in its center is rotatably contained in the hard case.

According to still another aspect of the invention, the shape of the anti-abrasion chip is a regular triangle, a right-angled triangle, an isosceles triangle, a square, a rectangle, a trapezoid such as a right-angled trapezoid, a parallelogram or the like.

Other and further objects, features and advantages of the invention will appear more fully from the following description taken in connection with the accompanying drawings, wherein:

DESCRIPTION OF THE PREFERRED EMBODIMENTS

Referring to the drawings, wherein similar or corresponding components are designated by like reference numerals throughout the different figures, there are shown in FIGS. 7-14 some embodiments of the present invention.

Figure 7:
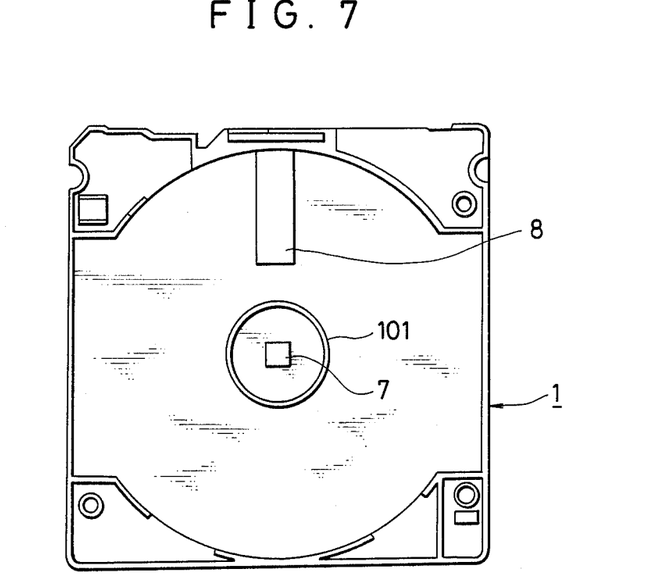
FIG. 7 is a bottom view of a cover member for a magnetic disk cartridge according to the present invention.

In FIG. 7, there is shown one embodiment of a cover member 1, seen from its inside, for a magnetic disk cartridge according to the present invention, which has a similar construction to the conventional magnetic disk cartridge shown in FIGS. 1-6, described above, except that a shape of an anti-abrasion chip 7 is square shaped rather than circular shaped. The square anti-abrasion chip 7 can be obtained by cutting the anti-abrasion sheet belt 12 attached to the base sheet 13 perpendicularly to the longitudinal direction of the sheet belt 12 at the same distance as its width by means of a proper cutter, as shown by straight cutting lines X in FIG. 9.

Figure 9:
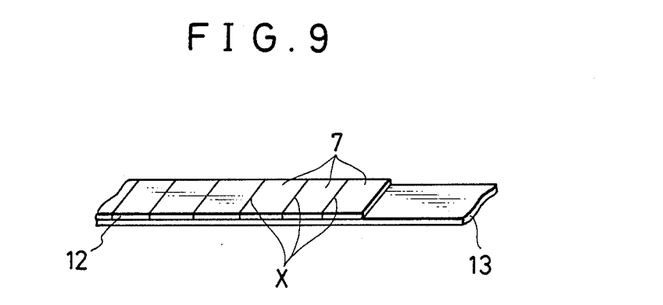
FIG. 9 is a perspective view of an anti-abrasion sheet belt for explaining a production of an anti-abrasion chip by cutting according to the present invention.
Figure 10:
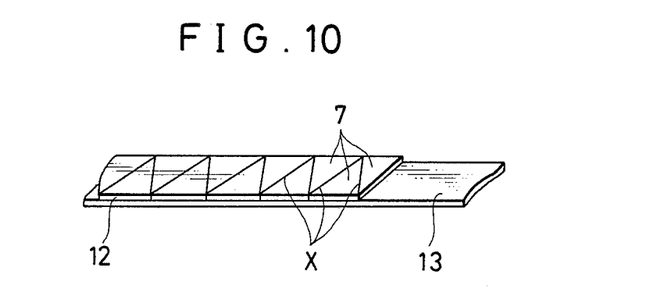
FIG. 10 is a perspective view of an anti-abrasion sheet belt for explaining a production of another anti-abrasion chip by cutting according to the present invention.

It is readily understood that the anti-abrasion chips 7 are consecutively obtained without producing a disuse portion of the anti-abrasion sheet belt 12, which is economical, with the result of a lower producing cost of the magnetic disk cartridge.

Figure 8:
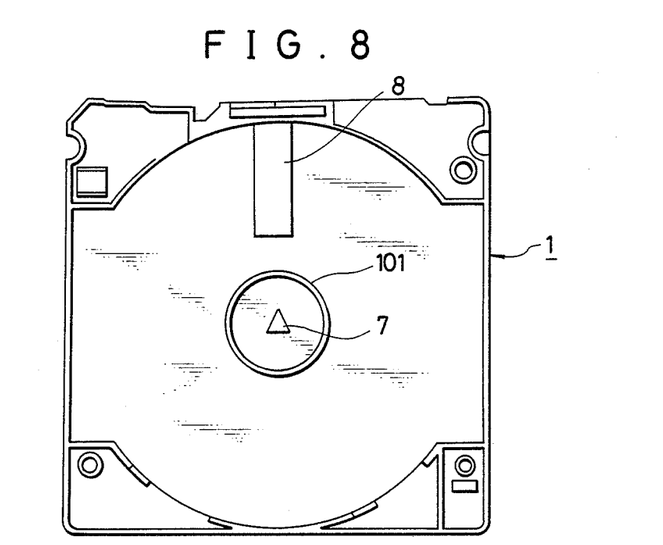
FIG. 8 is a bottom view of another cover member for a magnetic disk cartridge according to the present invention.

In FIG. 8, there is shown another embodiment of a cover member 1 according to the present invention. In this case, the anti-abrasion chip 7 is formed in a regular triangular shape by cutting the sheet belt 12 in the similar manner to the first embodiment, as shown by straight cutting lines X in FIG. 10. In this case, the same effects as the first embodiment can be obtained.

Figure 11:
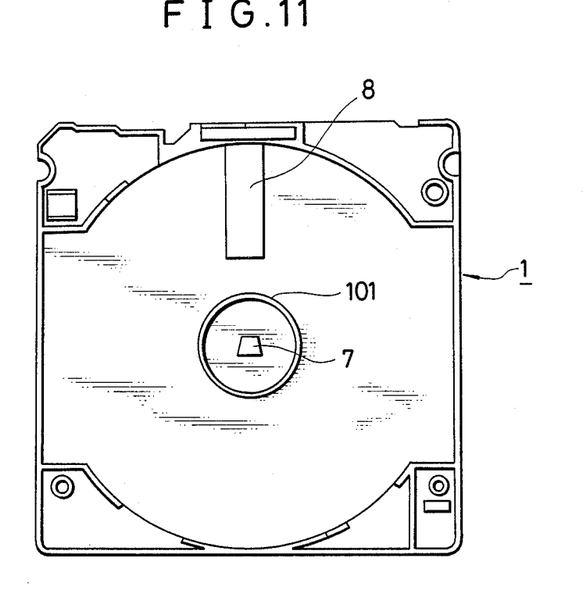
FIG. 11 is a bottom view of still another cover member for a magnetic disk cartridge according to the present invention.
Figure 12:
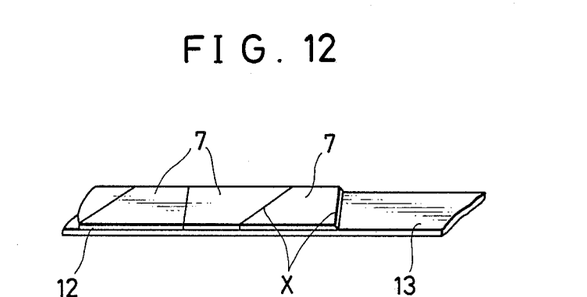
FIG. 12 is a perspective view of an anti-abrasion sheet belt for explaining a production of still another anti-abrasion chip by cutting according to the present invention.

In FIGS. 11 and 12, there are shown still another embodiments of a cover member 1 and anti-abrasion chips 7 having a trapezoid shape according to the present invention. In this case, the anti-abrasion chips 7 are obtained in the similar manner to the above described embodiments. The same effects as those embodiments can be obtained.

In these embodiments, the anti-abrasion sheet 12 is made of a material selected from the group consisting of a super-high molecular weight polyethylene, polyamides, polycarbonates, polyacetals and fluorocarbon resins, and especially the super-high-molecular weight polyethylene is preferably used. An adhesive is desirably applied to the contact surface of the anti-abrasion sheet 12 with respect to the base sheet 13. In order to readily peel off the anti-abrasion sheet 12 from the base sheet 13, the contact surface of the base sheet 13 may be surface-treated by an agent such as a silicone or the like.

Figure 13:
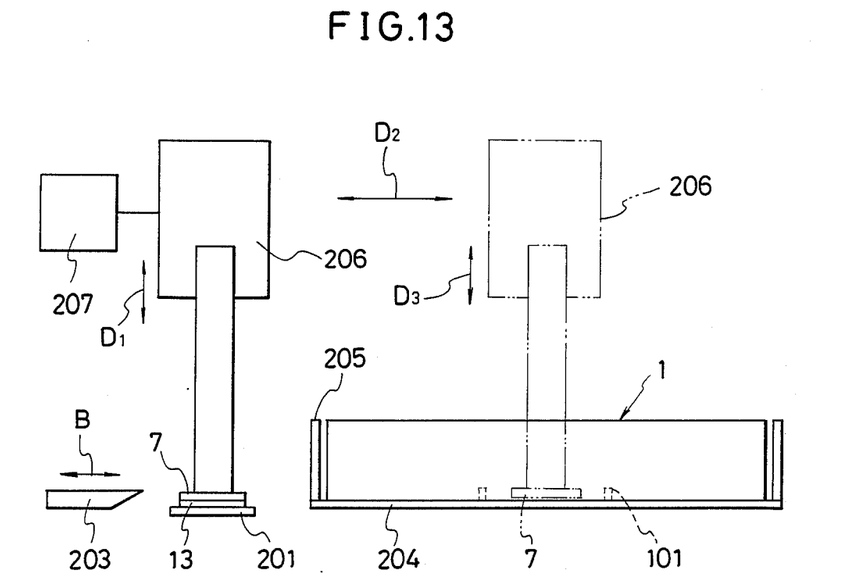
FIG. 13 is a schematic view of an essential part of an apparatus for producing a magnetic disk cartridge according to the present invention.
Figure 14:
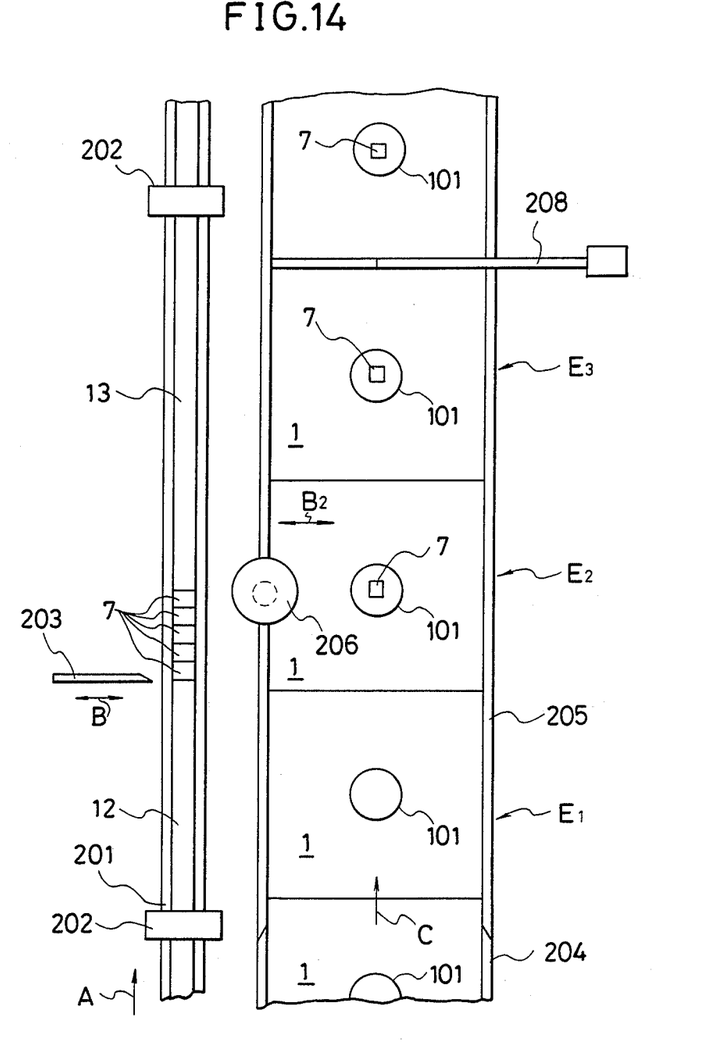
FIG. 14 is a top plan view of FIG. 13.

In FIGS. 13 and 14, an essential part of an apparatus for producing a magnetic disk cartridge according to the present invention is shown. The anti-abrasion sheet belt 12 attached to the base sheet 13 is moved in a direction A by and on a conveyer belt 201 and support rollers 202. The anti-abrasion sheet belt 12 is cut by a thin and sharp cutter 203 which is moved in a direction B across the sheet belt 12 by a proper means to obtain the anti-abrasion chip 7 having a polygon shape such as a square when the conveyer belt 201 which is intermittently moved, is temporally stopped.

A plurality of cover members 1 are stacked one on another upside down in a magazine (not shown), and are supplied one by one onto a path 204 which is arranged in parallel with the conveyer belt 201 at a certain distance away therefrom. The upside down cover members 1 are moved in a direction C on the path 204 by a proper pushing means (not shown), and this pushing movement is carried out intermittently in synchronization with the intermittent movement of the conveyer belt 201. Thus, the cover members 1 are temporally stopped at stop positions $E_1$, $E_2$ and $E_3$, consecutively. On the path 204 a pair of guide walls 205 are provided on its both sides so as to guide the both sides of the cover members 1.

While the conveyer belt 201 and the cover members 1 on the path 204 are stopped temporally, a suction means 206 which is connected to a vacuum source 207 such as a vacuum pump and which is positioned above the cut anti-abrasion chip 7, is moved downwards onto the anti-abrasion chip 7 to catch it. Then, the suction means 206 catching the chip 7 is moved upwards and then is moved sideways above the center of the cover member 1 positioned in the stop position $E_2$ of FIG. 14. Then, the suction means 206 with the anti-abrasion chip 7 is lowered onto the center of the circular ring projection 101 of the cover member 1 and then the suction means 206 releases the anti-abrasion chip 7 so that the chip 7 is attached to the center of the circular ring projection 101 by virture of the adhesive applied to the contact surface of the chip 7. Then, the suction means 206 alone is moved back in reverse above the anti-abrasion chip 7 cut on the base sheet 13 on the conveyer belt 201. As described above, the suction means 206 is moved up and down in a direction $D_1$, then sideways in a direction $D_2$ and up and down in a direction $D_3$, as shown in FIG. 13.

The cover members 1 are exactly positioned in the stop positions $E_1$, $E_2$ and $E_3$ by a positioning lever 208 which is pivoted horizontally so as to stop and to allow to pass the cover members 1 on which the chips 7 are attached, one by one intermittently.

Then, the cover members 1 with the chips 7 are discharged one by one from the path 204 and then are stored in a stacked position in a magazine (not shown).

Then, the cover member 1 with the chip 7 and the bottom member 2 are coupled to obtain the hard case while the magnetic disk 3 is rotatably contained in the hard case, thereby obtaining a magnetic disk cartridge.

Although the shape of the anti-abrasion chip 7 is square, regular triangular and trapezoid in the preferred embodiments described above, however, it is not restricted to these shapes, and it can be shaped in a polygon shape including a triangle. The shape of the anti-abrasion chip 7 is preferably a regular triangle, a right-angled triangle, an isosceles triangle, a square, a rectangle, a trapezoid such as a right-angled trapezoid, a parallelogram or the like.

Although the adhesive is applied to the contact surface of the anti-abrasion sheet 12 and thus the anti-abrasion chip 7 in the above described embodiments, however, the adhesive may be applied to the predetermined position of the inner surface of the cover member 1.

Although the present invention has been described with reference to preferred embodiments thereof illustrated in the accompanying drawings, however, various changes and modifications can be made by those skilled in the art without departing from the scope of the present invention.

What is claimed is:

1. A magnetic disk cartridge for rotatably containing a magnetic disk therein, in which the magnetic disk is rotated by disk drive means having a pivot shaft, comprising
   a hard case which is composed of a cover member and a bottom member;
   a magnetic disk having a hole in its center, which is rotatably contained in the hard case; and
   an anti-abrasion chip consisting of a polygon shape including a triangle, which is attached to the inside of the case and which receives a free tip of the pivot shaft of the disk drive means in contact therewith, the pivot shaft being inserted in the central hole of the magnetic disk.

2. A cartridge as defined in claim 1, wherein the shape of the anti-abrasion chip is a regular triangle.

3. A cartridge as defined in claim 1, wherein the shape of the anti-abrasion chip is a right-angled triangle.

4. A cartridge as defined in claim 1, wherein the shape of the anti-abrasion chip is an isosceles triangle.

5. A cartridge as defined in claim 1, wherein the shape of the anti-abrasion chip is a square.

6. A cartridge as defined in claim 1, wherein the shape of the anti-abrasion chip is a rectangle.

7. A cartridge as defined in claim 1, wherein the shape of the anti-abrasion chip is a trapezoid.

8. A cartridge as defined in claim 1, wherein the shape of the anti-abrasion chip is a right-angled trapezoid.

9. A cartridge as defined in claim 1, wherein the shape of the anti-abrasion chip is a parallelogram.

10. A cartridge as defined in claim 1, wherein the shape at the anti-abrasion chip is a parallelogram.

11. A hard-type magnetic disk cartridge, comprising:
    a cover member;
    a bottom member interfacing with the cover member and having an opening;
    a ring projection fixed to the cover member and extending toward the opening of the bottom member, and
    an anti-abrasion member, formed from a planar sheet, mounted on the surface of the cover member by an adhesive and disposed within the ring projection, the outer border of the anti-abrasion member consisting of a perimeter having only straight sides whereby the entire planar sheet can be used without wastage in production of disk cartridges.

12. The invention of claim 11 wherein the ring projection has a boundary length that is greater than the total length of the straight sides of the anti-abrasion member.

13. The invention of claim 12 wherein the ring projection is circular shaped.

14. The invention of claim 11 wherein the anti-abrasion member has at least three sides.

15. The invention of claim 11 wherein the anti-abrasion member is quadrilateral shaped.

16. A hard-type magnetic disk cartridge in which a magnetic disk can be rotated by a disk drive means, consisting of:
   a cover member;
   a bottom member interfacing with the cover member and configured to permit the disk drive means to drive the disk;
   a ring projection fixed to the bottom member;
   a hub portion interfacing with the ring projection, and
   an anti-abrasion chip disposed within the ring projection, the anti-abrasion chip having a perimeter bounded only by straight sides and formed from a planar sheet whereby the entire sheet can be used without wastage in production of disk cartridges.

17. The invention of claim 16 wherein the anti-abrasion chip has at least three sides.

18. The invention of claim 17 wherein the anti-abrasion chip is quadrilateral shaped.

19. The invention of claim 18 wherein the anti-abrasion chip is square shaped.

20. The invention of claim 19 wherein the ring projection is circular shaped and has a circumferential length that is substantially greater than the total length of the four sides of the anti-abrasion chip.

* * * * *